(12) United States Patent
Karantonis

(10) Patent No.: US 12,496,449 B2
(45) Date of Patent: Dec. 16, 2025

(54) DETECTION OF NEURAL RESPONSES TO NEUROSTIMULATION

(71) Applicant: Saluda Medical Pty Ltd, Level (AU)

(72) Inventor: Dean Michael Karantonis, Artarmon (AU)

(73) Assignee: Saluda Medical Pty Ltd, Macquarie Park (AU)

( * ) Notice: Subject to any disclaimer, the term of this patent is extended or adjusted under 35 U.S.C. 154(b) by 369 days.

(21) Appl. No.: 18/169,094

(22) Filed: Feb. 14, 2023

(65) Prior Publication Data

US 2023/0277852 A1 Sep. 7, 2023

(30) Foreign Application Priority Data

Feb. 14, 2022 (AU) .............................. 2022900303

(51) Int. Cl.
*A61N 1/36* (2006.01)
(52) U.S. Cl.
CPC ....... *A61N 1/3614* (2017.08); *A61N 1/36146* (2013.01)
(58) Field of Classification Search
CPC .................. A61N 1/36146; A61N 1/36139
See application file for complete search history.

(56) References Cited

U.S. PATENT DOCUMENTS

| 6,931,281 | B2 * | 8/2005 | Bradley | ................ | A61N 1/371 |
| | | | | | 607/9 |
| 2010/0010388 | A1 * | 1/2010 | Panken | .............. | A61N 1/36139 |
| | | | | | 600/595 |
| 2016/0287126 | A1 * | 10/2016 | Parker | ................ | A61N 1/36139 |
| 2016/0287182 | A1 * | 10/2016 | Single | ................ | A61N 1/36139 |
| 2017/0135624 | A1 * | 5/2017 | Parker | ................ | A61N 1/36135 |
| 2019/0298992 | A1 * | 10/2019 | Zhang | ................ | A61N 1/0553 |

(Continued)

FOREIGN PATENT DOCUMENTS

| WO | WO2012155183 | | 11/2012 |
| WO | WO2012155185 A1 | | 11/2012 |

(Continued)

*Primary Examiner* — William J Levicky
(74) *Attorney, Agent, or Firm* — Barnes & Thornburg LLP

(57) ABSTRACT

Disclosed is an implantable device for controllably delivering a neural stimulus. The device comprises: a plurality of electrodes including one or more stimulus electrodes and one or more sense electrodes; a stimulus source configured to provide a neural stimulus to be delivered via the one or more stimulus electrodes to a neural pathway of a patient in order to evoke a neural response on the neural pathway; measurement circuitry configured to process a signal window sensed at the one or more sense electrodes subsequent to the delivered neural stimulus, the sensed signal window including an evoked neural response; and a control unit. The control unit is configured to: control the stimulus source to provide the neural stimulus according to a stimulus parameter; estimate, using a detector, a location of the evoked neural response within the sensed signal window; determine, based on the location of the evoked neural response within the sensed signal window, whether truncation of the evoked neural response by the sensed signal window is occurring; and mitigate, based on the determination, the truncation of the evoked neural response.

28 Claims, 9 Drawing Sheets

(56) References Cited

U.S. PATENT DOCUMENTS

2023/0241376 A1   8/2023   Single et al.
2023/0310864 A1  10/2023   Parker

FOREIGN PATENT DOCUMENTS

| WO | WO2012155188    | 11/2012 |
|----|-----------------|---------|
| WO | WO2015074121 A1 |  5/2015 |
| WO | WO2019204884    | 10/2019 |
| WO | WO2020101853 A1 |  5/2020 |
| WO | WO2020124135 A1 |  6/2020 |
| WO | WO2021007615 A1 |  1/2021 |
| WO | WO2021158310 A1 |  8/2021 |
| WO | WO2022182611 A1 |  9/2022 |
| WO | WO2022183172 A1 |  9/2022 |
| WO | WO2022245970 A1 | 11/2022 |
| WO | WO2023064081 A1 |  4/2023 |
| WO | WO2023150020 A1 |  8/2023 |

\* cited by examiner

DETECTION OF NEURAL RESPONSES TO NEUROSTIMULATION

The present application claims priority from Australian Provisional Patent Application No 2022900303 filed on 14 Feb. 2022, the contents of which are incorporated herein by reference in their entirety.

TECHNICAL FIELD

The present invention relates to neural stimulation therapy in and in particular to methods and devices for improved detection of evoked neural responses to neural stimulation.

BACKGROUND OF THE INVENTION

There are a range of situations in which it is desirable to apply neural stimuli in order to alter neural function, a process known as neuromodulation. For example, neuromodulation is used to treat a variety of disorders including chronic neuropathic pain, Parkinson's disease, and migraine. A neuromodulation system applies an electrical pulse (stimulus) to neural tissue (fibres, or neurons) in order to generate a therapeutic effect. In general, the electrical stimulus generated by a neuromodulation system evokes a neural response known as an action potential in a neural fibre which then has either an inhibitory or excitatory effect. Inhibitory effects can be used to modulate an undesired process such as the transmission of pain, or excitatory effects may be used to cause a desired effect such as the contraction of a muscle.

When used to relieve neuropathic pain originating in the trunk and limbs, the electrical pulse is applied to the dorsal column (DC) of the spinal cord, a procedure referred to as spinal cord stimulation (SCS). Such a system typically comprises an implanted electrical pulse generator, and a power source such as a battery that may be transcutaneously rechargeable by wireless means, such as inductive transfer. An electrode array is connected to the pulse generator, and is implanted adjacent the target neural fibre(s) in the spinal cord, typically in the dorsal epidural space above the dorsal column. An electrical pulse of sufficient intensity applied to the target neural fibres by a stimulus electrode causes the depolarisation of neurons in the fibres, which in turn generates an action potential in the fibres. Action potentials propagate along the fibres in orthodromic (towards the head, or rostral) and antidromic (towards the cauda, or caudal) directions. The fibres being stimulated in this way inhibit the transmission of pain from a region of the body innervated by the target neural fibres (the dermatome) to the brain. To sustain the pain relief effects, stimuli are applied repeatedly, for example at a frequency in the range of 30 Hz-100 Hz.

For effective and comfortable neuromodulation, it is necessary to maintain stimulus intensity above a recruitment threshold. Stimuli below the recruitment threshold will fail to recruit sufficient neurons to generate action potentials with a therapeutic effect. In almost all neuromodulation applications, response from a single class of fibre is desired, but the stimulus waveforms employed can evoke action potentials in other classes of fibres which cause unwanted side effects. In pain relief, it is therefore desirable to apply stimuli with intensity below a discomfort threshold, above which uncomfortable or painful percepts arise due to over-recruitment of $A\beta$ fibres. When recruitment is too large, $A\beta$ fibres produce uncomfortable sensations. Stimulation at high intensity may even recruit $A\delta$ fibres, which are sensory nerve fibres associated with acute pain, cold and pressure sensation. It is therefore desirable to maintain stimulus intensity within a therapeutic range between the recruitment threshold and the discomfort threshold.

The task of maintaining appropriate neural recruitment is made more difficult by electrode migration (change in position over time) and/or postural changes of the implant recipient (patient), either of which can significantly alter the neural recruitment arising from a given stimulus, and therefore the therapeutic range. There is room in the epidural space for the electrode array to move, and such array movement from migration or posture change alters the electrode-to-fibre distance and thus the recruitment efficacy of a given stimulus. Moreover, the spinal cord itself can move within the cerebrospinal fluid (CSF) with respect to the dura. During postural changes, the amount of CSF and/or the distance between the spinal cord and the electrode can change significantly. This effect is so large that postural changes alone can cause a previously comfortable and effective stimulus regime to become either ineffectual or painful.

Attempts have been made to address such problems by way of feedback or closed-loop control, such as using the methods set forth in International Patent Publication No. WO2012155188 by the present applicant. Feedback control seeks to compensate for relative nerve/electrode movement by controlling the intensity of the delivered stimuli so as to maintain a substantially constant neural recruitment. The intensity of a neural response evoked by a stimulus may be used as a feedback variable representative of the amount of neural recruitment. A signal representative of the neural response may be sensed by a measurement electrode in electrical communication with the recruited neural fibres, and processed to obtain the feedback variable. Based on the response intensity, the intensity of the applied stimulus may be adjusted to maintain the response intensity within a therapeutic range.

It is therefore desirable to accurately measure the intensity and other characteristics of a neural response evoked by the stimulus. The action potentials generated by the depolarisation of a large number of fibres by a stimulus sum to form a measurable signal known as an evoked compound action potential (ECAP). Accordingly, an ECAP is the sum of responses from a large number of single fibre action potentials. The ECAP generated from the depolarisation of a group of similar fibres may be measured at a measurement electrode as a positive peak potential, then a negative peak, followed by a second positive peak. This morphology is caused by the region of activation passing the measurement electrode as the action potentials propagate along the individual fibres.

Approaches proposed for obtaining a neural response measurement are described by the present applicant in International Patent Publication No. WO2012/155183, the content of which is incorporated herein by reference.

However, neural response measurement can be a difficult task as a neural response component in the sensed signal will typically have a maximum amplitude in the range of microvolts. In contrast, a stimulus applied to evoke the response is typically several volts, and manifests in the measured response as crosstalk of that magnitude. Moreover, stimulus generally results in electrode artefact, which manifests in the measured response as a decaying output of the order of several millivolts after the end of the stimulus. As the neural response can be contemporaneous with the stimulus crosstalk and/or the stimulus artefact, neural response measurements present a difficult challenge of measurement amplifier design. For example, to resolve a 10 μV ECAP with 1 μV resolution in the presence of stimulus crosstalk of 5 V requires an amplifier with a dynamic range of 134 dB, which is impractical in implantable devices. In practice, many non-ideal aspects of a circuit lead to artefact, and as these aspects mostly result a time-decaying artefact waveform of positive or negative polarity, their identification and elimination can be laborious.

Evoked neural responses are less difficult to detect when they appear later in time than the artefact, or when the signal-to-noise ratio is sufficiently high. The artefact appears within an interval after the stimulus that is independent of the separation between the stimulus electrodes and the measurement electrodes, for example 1-2 ms after the stimulus. By contrast, the neural response is a propagating signal whose arrival time at a measurement electrode is proportional to the distance between the measurement electrode and the stimulus site divided by the conduction velocity of the fibre along which the neural responses are travelling. In certain circumstances the neural response may therefore be substantially separated in time from the artefact, so a neural response measurement can be more easily obtained. This is the case in surgical monitoring where there are large distances (e.g. more than 12 cm for nerves conducting at 60 ms$^{-1}$) between the stimulus and measurement electrodes so that the propagation time from the stimulus site to the measurement electrodes exceeds 2 ms, which is longer than the typical duration of stimulus artefact. One approach is to disconnect or "blank" the measurement circuitry, starting with the amplifier, from the measurement electrodes during the stimulus delivery and for some blanking interval following the stimulus delivery. The measurement circuitry may also be programmed to capture a signal window starting after a further delay from the end of the blanking interval. If the blanking interval and the delay are chosen according to the expected conduction velocity of the evoked neural response, blanking prevents the crosstalk and at least some portion of the artefact from reaching the measurement circuitry while allowing the evoked neural response to reach the measurement circuitry.

However, to characterize the responses from the dorsal column, high stimulation currents are required, making the stimulus crosstalk and subsequent artefact far larger than the evoked response signal. Similarly, any implanted neuromodulation device will necessarily be of compact size, so that for such devices to monitor the effect of applied stimuli, the stimulus electrode(s) and measurement electrode(s) will necessarily be in close proximity. In such situations the stimulus crosstalk and artefact may not be well separated in time from the evoked neural response, and in fact may even overlap with it. Blanking will therefore prevent a substantial early portion of the evoked neural response from reaching the measurement circuitry, resulting in a truncated neural response, if one can even be measured at all. Such truncation corrupts the measurement of the characteristics of the evoked neural response, perhaps even rendering the sensed signal useless as a representation of the evoked neural response.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In this specification, a statement that an element may be "at least one of" a list of options is to be understood to mean that the element may be any one of the listed options, or may be any combination of two or more of the listed options.

SUMMARY OF THE INVENTION

Disclosed herein are methods and devices for measurement of neural responses that use a model-based detector to estimate the amount of truncation of the neural response, within a captured signal window and (optionally) to estimate the intensity of the un-truncated neural response. The estimated truncation amount may be used to inform remedial action that may reduce the amount of truncation experienced subsequently. Examples of remedial action include adjusting the delay of a correlation-based detector, adjusting the amplitude measured by the correlation-based detector, and adjusting the measurement electrodes used to sense the response signal.

According to a first aspect of the present technology, there is provided an implantable device for controllably delivering a neural stimulus. The device comprises: a plurality of electrodes including one or more stimulus electrodes and one or more sense electrodes; a stimulus source configured to provide a neural stimulus to be delivered via the one or more stimulus electrodes to a neural pathway of a patient in order to evoke a neural response on the neural pathway; measurement circuitry configured to process a signal window sensed at the one or more sense electrodes subsequent to the delivered neural stimulus, the sensed signal window including an evoked neural response; and a control unit. The control unit is configured to: control the stimulus source to provide the neural stimulus according to a stimulus parameter; estimate, using a detector, a location of the evoked neural response within the sensed signal window; determine, based on the location of the evoked neural response within the sensed signal window, whether truncation of the evoked neural response by the sensed signal window is occurring; and mitigate, based on the determination, the truncation of the evoked neural response.

According to a second aspect of the present technology, there is provided an automated method of controllably delivering a neural stimulus. The method comprises: delivering, via one or more stimulus electrodes of a plurality of electrodes, the neural stimulus to a neural pathway of a patient in order to evoke a neural response on the neural pathway, the stimulus being parametrised by a stimulus parameter; sensing a signal window subsequent to the delivered neural stimulus at one or more sense electrodes of the plurality of electrodes, the sensed signal window including an evoked neural response; estimating, using a detector, a location of the evoked neural response within the sensed signal window including the evoked neural response; determining, based on the location of the evoked neural response within the sensed signal window, whether truncation of the evoked neural response by the sensed signal window is occurring; and mitigating, based on the determination, the truncation of the evoked neural response.

In some embodiments the detector may be a correlation-based detector. The control unit may in some embodiments be configured to estimate the location of the evoked neural response within the sensed signal window from an optimum delay of the correlation-based detector. The control unit may in some embodiments be further configured to fit, using a model-based detector, based on the determination of whether truncation is occurring, an ECAP component to the signal window. The control unit may in some embodiments be configured to mitigate the truncation by adjusting a parameter of the correlation-based detector based on an amount of truncation of the fitted ECAP component by the signal window. The control unit may in some embodiments be configured to mitigate the truncation by adjusting an optimum delay of the correlation-based detector based on a location of the fitted ECAP component within the signal window. The control unit may in some embodiments be configured to mitigate the truncation by computing an amplitude adjustment factor based on an amplitude of the fitted ECAP component. The control unit may in some embodiments be configured to compute the amplitude adjustment factor by dividing an amplitude of the fitted ECAP component by an intensity of the evoked neural response measured by the correlation-based detector.

The detector may in some embodiments be a model-based detector. The control unit may in some embodiments be further configured to fit, using the model-based detector, an ECAP component to the signal window, thereby estimating the location of the evoked neural response within the sensed signal window.

In some embodiments the control unit may be configured to mitigate the truncation by adjusting a pulse width of the neural stimulus.

The control unit may in some embodiments be configured to mitigate the truncation by changing the one or more sense electrodes to different electrodes among the plurality of electrodes.

In some embodiments the control unit may be further configured to: measure, using the detector, an intensity of the evoked neural response; compute a feedback variable from the measured intensity of the evoked neural response; and implement a feedback controller which completes a feedback loop, the feedback controller using the computed feedback variable to control the stimulus parameter so as to maintain the feedback variable at a target response intensity.

According to a third aspect of the present technology, there is provided a neural stimulation system, comprising: a plurality of electrodes including one or more stimulus electrodes and one or more sense electrodes; a stimulus source configured to provide a neural stimulus to be delivered via the one or more stimulus electrodes to a neural pathway of a patient in order to evoke a neural response on the neural pathway; measurement circuitry configured to process a signal window sensed at the one or more sense electrodes subsequent to the delivered neural stimulus, the sensed signal window including an evoked neural response; a control unit configured to control the stimulus source to provide the neural stimulus according to a stimulus parameter; and a processor. The processor is configured to: estimate, using a detector, a location of the evoked neural response within the sensed signal window; determine, based on the location of the evoked neural response within the sensed signal window, whether truncation of the evoked neural response by the sensed signal window is occurring; and mitigate, based on the determination, the truncation of the evoked neural response.

Some embodiments may further comprise an external computing device in communication with the neuromodulation device. The processor may be part of the external computing device.

In some embodiments the processor is part of the neuromodulation device.

References herein to estimation, determination, comparison and the like are to be understood as referring to an automated process carried out on data by a processor operating to execute a predefined procedure suitable to effect the described estimation, determination and/or comparison step(s). The technology disclosed herein may be implemented in hardware (e.g., using digital signal processors, application specific integrated circuits (ASICs) or field programmable gate arrays (FPGAs)), or in software (e.g., using instructions tangibly stored on non-transitory computer-readable media for causing a data processing system to perform the steps described herein), or in a combination of hardware and software. The disclosed technology can also be embodied as computer-readable code on a computer-readable medium. The computer-readable medium can include any data storage device that can store data which can thereafter be read by a computer system. Examples of the computer-readable medium include read-only memory ("ROM"), random-access memory ("RAM"), magnetic tape, optical data storage devices, flash storage devices, or any other suitable storage devices. The computer-readable medium can also be distributed over network-coupled computer systems so that the computer-readable code is stored and/or executed in a distributed fashion.

BRIEF DESCRIPTION OF THE DRAWINGS

One or more implementations of the invention will now be described with reference to the accompanying drawings, in which.

DETAILED DESCRIPTION OF THE PRESENT TECHNOLOGY

Figure 1:
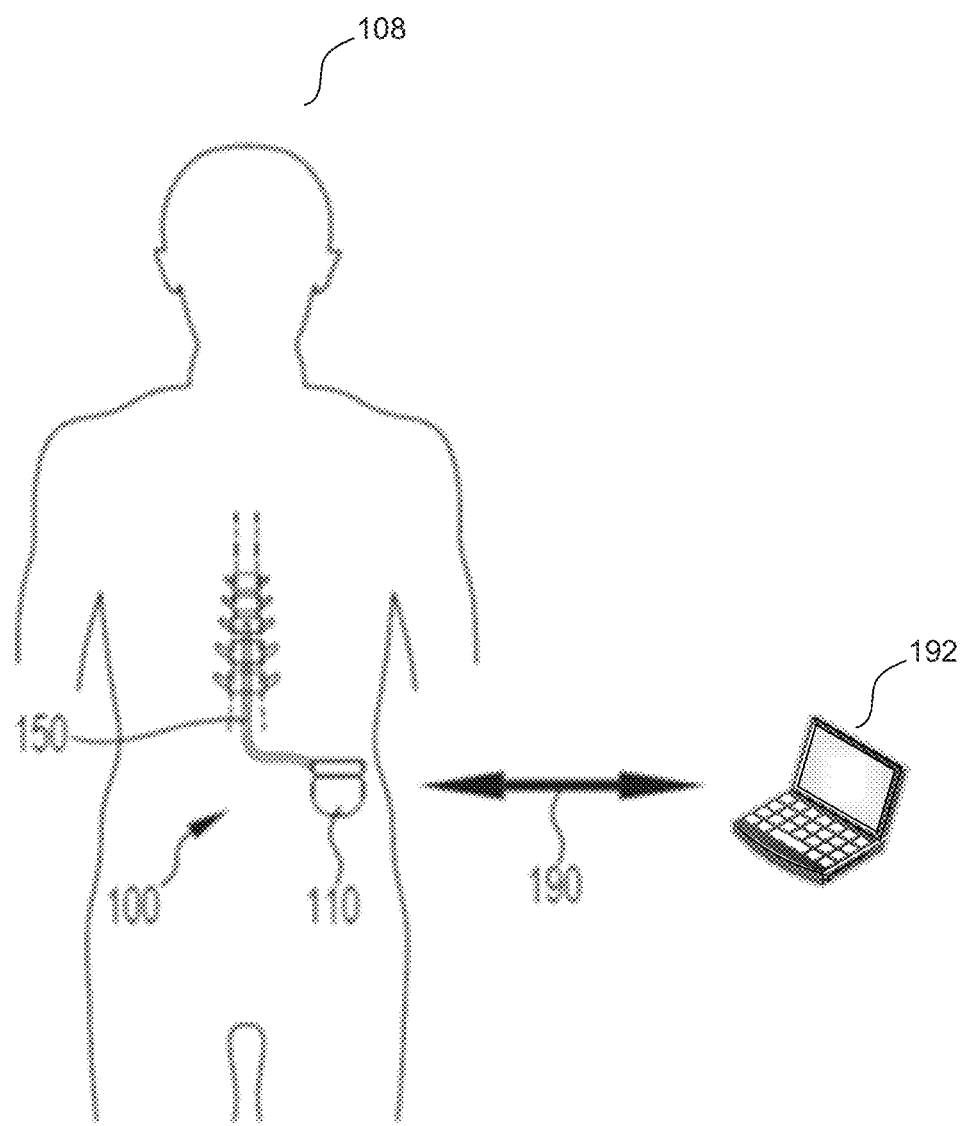
FIG. 1 schematically illustrates an implanted spinal cord stimulator, according to one implementation of the present technology.

FIG. 1 schematically illustrates an implanted spinal cord stimulator 100 in a patient 108, according to one implementation of the present technology. Stimulator 100 comprises an electronics module 110 implanted at a suitable location. In one implementation, stimulator 100 is implanted in the patient's lower abdominal area or posterior superior gluteal region. In other implementations, the electronics module 110 is implanted in other locations, such as a flank or sub-clavicularly. Stimulator 100 further comprises an electrode array 150 implanted within the epidural space and connected to the module 110 by a suitable lead. The electrode array 150 may comprise one or more electrodes such as electrode pads on a paddle lead, circular (e.g., ring) electrodes surrounding the body of the lead, conformable electrodes, cuff electrodes, segmented electrodes, or any other type of electrodes capable of forming unipolar, bipolar or multipolar electrode configurations for stimulation and measurement. The electrodes may pierce or affix directly to the tissue itself.

Numerous aspects of the operation of implanted stimulator 100 may be programmable by an external computing device 192, which may be operable by a user such as a clinician or the patient 108. Moreover, implanted stimulator 100 serves a data gathering role, with gathered data being communicated to external device 192 via a transcutaneous communications channel 190. Communications channel 190 may be active on a substantially continuous basis, at periodic intervals, at non-periodic intervals, or upon request from the external device 192. External device 192 may thus provide a clinical interface configured to program the implanted stimulator 100 and recover data stored on the implanted stimulator 100. This configuration is achieved by program instructions collectively referred to as the Clinical Programming Application (CPA) and stored in an instruction memory of the clinical interface.

Figure 2:
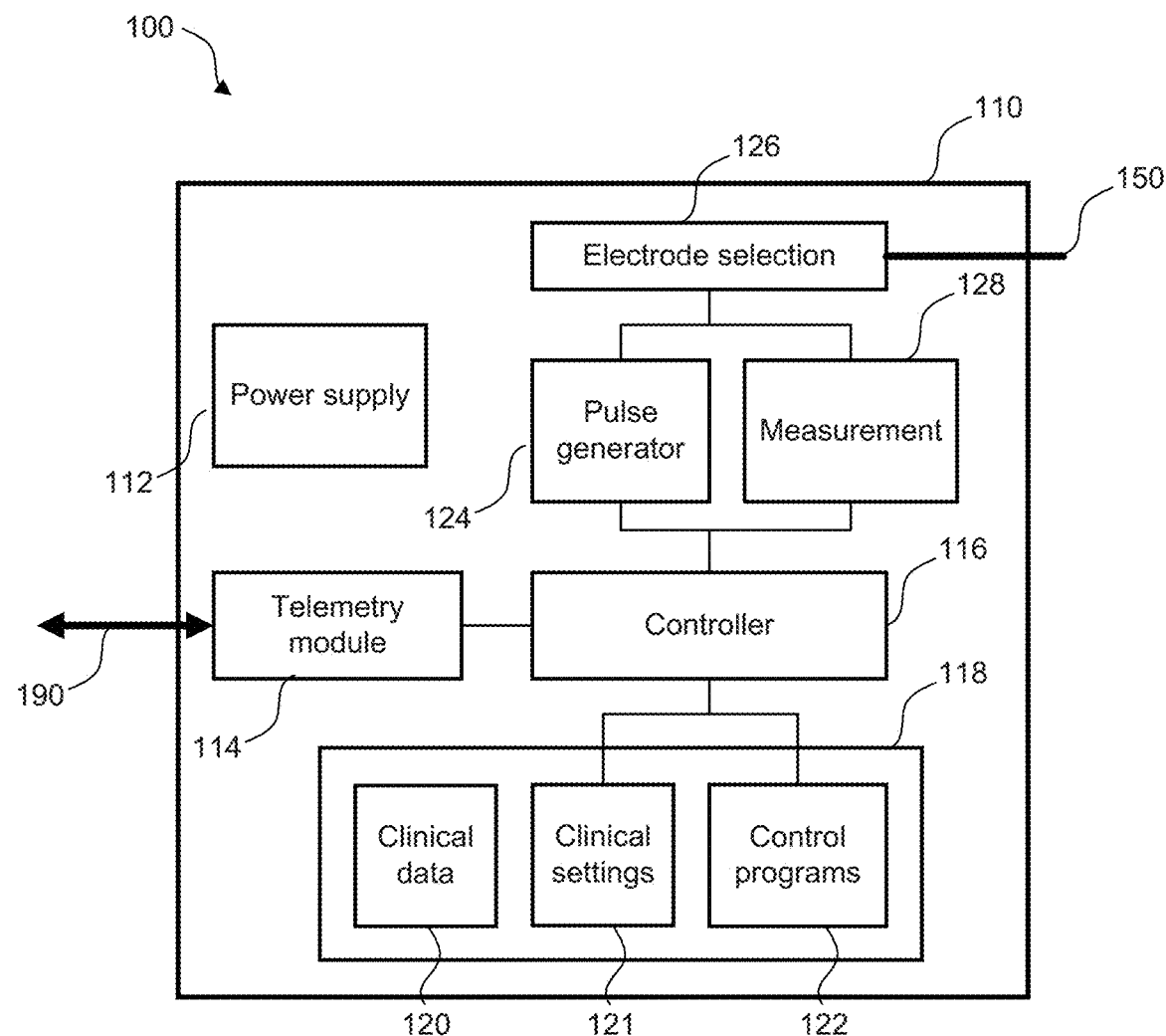
FIG. 2 is a block diagram of the stimulator of FIG. 1.

FIG. 2 is a block diagram of the stimulator 100. Electronics module 110 contains a battery 112 and a telemetry module 114. In implementations of the present technology, any suitable type of transcutaneous communications channel 190, such as infrared (IR), radiofrequency (RF), capacitive and/or inductive transfer, may be used by telemetry module 114 to transfer power and/or data to and from the electronics module 110 via communications channel 190. Module controller 116 has an associated memory 118 storing one or more of clinical data 120, clinical settings 121, control programs 122, and the like. Controller 116 controls a pulse generator 124 to generate stimuli, such as in the form of electrical pulses, in accordance with the clinical settings 121 and control programs 122. Electrode selection module 126 switches the generated pulses to the selected electrode(s) of electrode array 150, for delivery of the pulses to the tissue surrounding the selected electrode(s). Measurement circuitry 128, which may comprise an amplifier and/or an analog-to-digital converter (ADC), is configured to process signals comprising neural responses sensed at measurement electrode(s) of the electrode array 150 as selected by electrode selection module 126.

Figure 3:
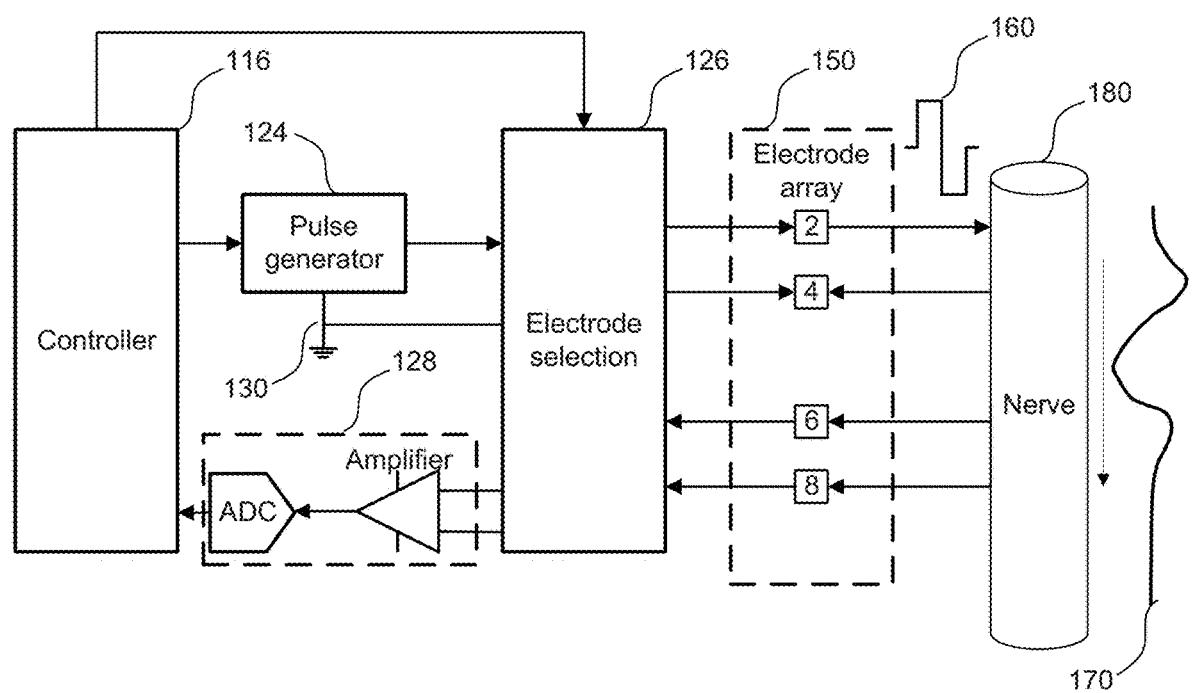
FIG. 3 is a schematic illustrating interaction of the implanted stimulator of FIG. 1 with a nerve.

FIG. 3 is a schematic illustrating interaction of the implanted stimulator 100 with a nerve 180 in the patient 108. In the implementation illustrated in FIG. 3 the nerve 180 may be located in the spinal cord, however in alternative implementations the stimulator 100 may be positioned adjacent any desired neural tissue including a peripheral nerve, visceral nerve, parasympathetic nerve or a brain structure. Electrode selection module 126 selects a stimulus electrode 2 of electrode array 150 through which to deliver a pulse from the pulse generator 124 to surrounding tissue including nerve 180. A pulse may comprise one or more phases, e.g. a biphasic stimulus pulse 160 comprises two phases. Electrode selection module 126 also selects a return electrode 4 of the electrode array 150 for stimulus current return in each phase, to maintain a zero net charge transfer. An electrode may act as both a stimulus and a return electrode over a complete multiphasic stimulus pulse. The use of two electrodes in this manner for delivering and returning current in each stimulus phase is referred to as bipolar stimulation. Alternative embodiments may apply other forms of bipolar stimulation, or may use a greater number of stimulus and/or return electrodes. The set of stimulus and return electrodes is referred to as the stimulus electrode configuration. Electrode selection module 126 is illustrated as connecting to a ground 130 of the pulse generator 124 to enable stimulus current return via the return electrode 4. However, other connections for charge recovery may be used in other implementations.

Delivery of an appropriate stimulus from electrodes 2 and 4 to the nerve 180 evokes a neural response 170 comprising an evoked compound action potential (ECAP) which will propagate along the nerve 180 as illustrated at a rate known as the conduction velocity. The ECAP may be evoked for therapeutic purposes, which in the case of a spinal cord stimulator for chronic pain may be to create paraesthesia at a desired location. To this end, the electrodes 2 and 4 are used to deliver stimuli periodically at any therapeutically suitable frequency, for example 30 Hz, although other frequencies may be used including frequencies as high as the kHz range. In alternative implementations, stimuli may be delivered in a non-periodic manner such as in bursts, or sporadically, as appropriate for the patient 108. To program the stimulator 100 to the patient 108, a clinician may cause the stimulator 100 to deliver stimuli of various configurations which seek to produce a sensation that is experienced by the user as paraesthesia. When a stimulus electrode configuration is found which evokes paraesthesia in a location and of a size which is congruent with the area of the patient's body affected by pain, the clinician nominates that configuration for ongoing use. The therapy parameters may be loaded into the memory 118 of the stimulator 100 as the clinical settings 121.

Figure 6:
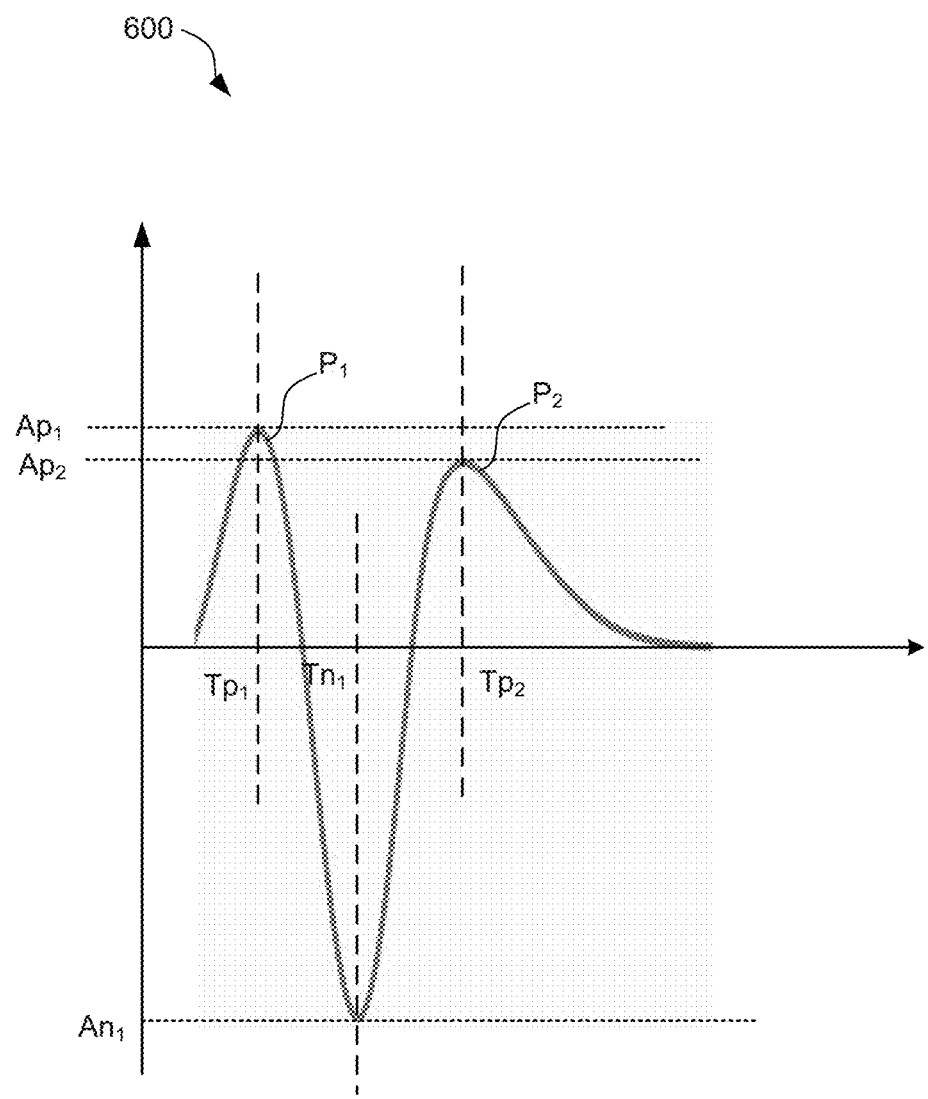
FIG. 6 illustrates the typical form of an electrically evoked compound action potential (ECAP) of a healthy subject.

FIG. 6 illustrates the typical form of an ECAP 600 of a healthy subject, as recorded at a single measurement electrode referenced to the system ground 130. The shape and duration of the single-ended ECAP 600 shown in FIG. 6 is predictable because it is a result of the ion currents produced by the ensemble of fibres depolarising and generating action potentials (APs) in response to stimulation. The evoked action potentials (EAPs) generated synchronously among a large number of fibres sum to form the ECAP 600. The ECAP 600 generated from the synchronous depolarisation of a group of similar fibres comprises a positive peak P1, then a negative peak N1, followed by a second positive peak P2. This shape is caused by the region of activation passing the measurement electrode as the action potentials propagate along the individual fibres.

The ECAP may be recorded differentially using two measurement electrodes, as illustrated in FIG. 3. Differential ECAP measurements are less subject to common-mode noise on the surrounding tissue than single-ended ECAP measurements. Depending on the polarity of recording, a differential ECAP may take an inverse form to that shown in FIG. 6, i.e. a form having two negative peaks N1 and N2, and one positive peak P1. Alternatively, depending on the distance between the two measurement electrodes, a differential ECAP may resemble the time derivative of the ECAP 600, or more generally the difference between the ECAP 600 and a time-delayed copy thereof.

The ECAP 600 may be characterised by any suitable characteristic(s) of which some are indicated in FIG. 6. The amplitude of the positive peak P1 is $Ap_1$ and occurs at time $Tp_1$. The amplitude of the positive peak P2 is $Ap_2$ and occurs at time $Tp_2$. The amplitude of the negative peak P1 is $An_1$ and occurs at time $Tn_1$. The peak-to-peak amplitude is $Ap_1+An_1$. A recorded ECAP will typically have a maximum peak-to-peak amplitude in the range of microvolts and a duration of 2 to 3 ms.

The stimulator 100 is further configured to detect the existence and measure the intensity of ECAPs 170 propagating along nerve 180, whether such ECAPs are evoked by the stimulus from electrodes 2 and 4, or otherwise evoked. To this end, any electrodes of the array 150 may be selected by the electrode selection module 126 to serve as recording electrode 6 and reference electrode 8, whereby the electrode selection module 126 selectively connects the chosen electrodes to the inputs of the measurement circuitry 128. Thus, signals sensed by the measurement electrodes 6 and 8 subsequent to the respective stimuli are passed to the measurement circuitry 128, which may comprise a differential amplifier and an analog-to-digital converter (ADC), as illustrated in FIG. 3. The recording electrode and the reference electrode are referred to as the measurement electrode pair. The measurement circuitry 128 for example may operate in accordance with the teachings of the above-mentioned International Patent Publication No. WO2012/155183.

Signals sensed by the measurement electrodes 6, 8 and processed by measurement circuitry 128 are further processed by an ECAP detector implemented within controller 116, configured by control programs 122, to obtain information regarding the effect of the applied stimulus upon the nerve 180. In some implementations, the sensed signals are processed by the ECAP detector in a manner which measures and stores one or more characteristics from each evoked neural response or group of evoked neural responses contained in the sensed signal. In one such implementation, the characteristics comprise a peak-to-peak ECAP amplitude in microvolts (µV). For example, the sensed signals may be processed by the ECAP detector to determine the peak-to-peak ECAP amplitude in accordance with the teachings of International Patent Publication No. WO2015/074121, the contents of which are incorporated herein by reference. Alternative implementations of the ECAP detector may measure and store an alternative characteristic from the neural response, or may measure and store two or more characteristics from the neural response.

Stimulator 100 applies stimuli over a potentially long period such as days, weeks, or months and during this time may store characteristics of neural responses, clinical settings, paraesthesia target level, and other operational parameters in memory 118. To effect suitable SCS therapy, stimulator 100 may deliver tens, hundreds or even thousands of stimuli per second, for many hours each day. Each neural response or group of responses generates one or more characteristics such as a measure of the intensity of the neural response. Stimulator 100 thus may produce such data at a rate of tens or hundreds of Hz, or even kHz, and over the course of hours or days this process results in large amounts of clinical data 120 which may be stored in the memory 118. Memory 118 is however necessarily of limited capacity and care is thus required to select compact data forms for storage into the memory 118, to ensure that the memory 118 is not exhausted before such time that the data is expected to be retrieved wirelessly by external device 192, which may occur only once or twice a day, or less.

Figure 4:
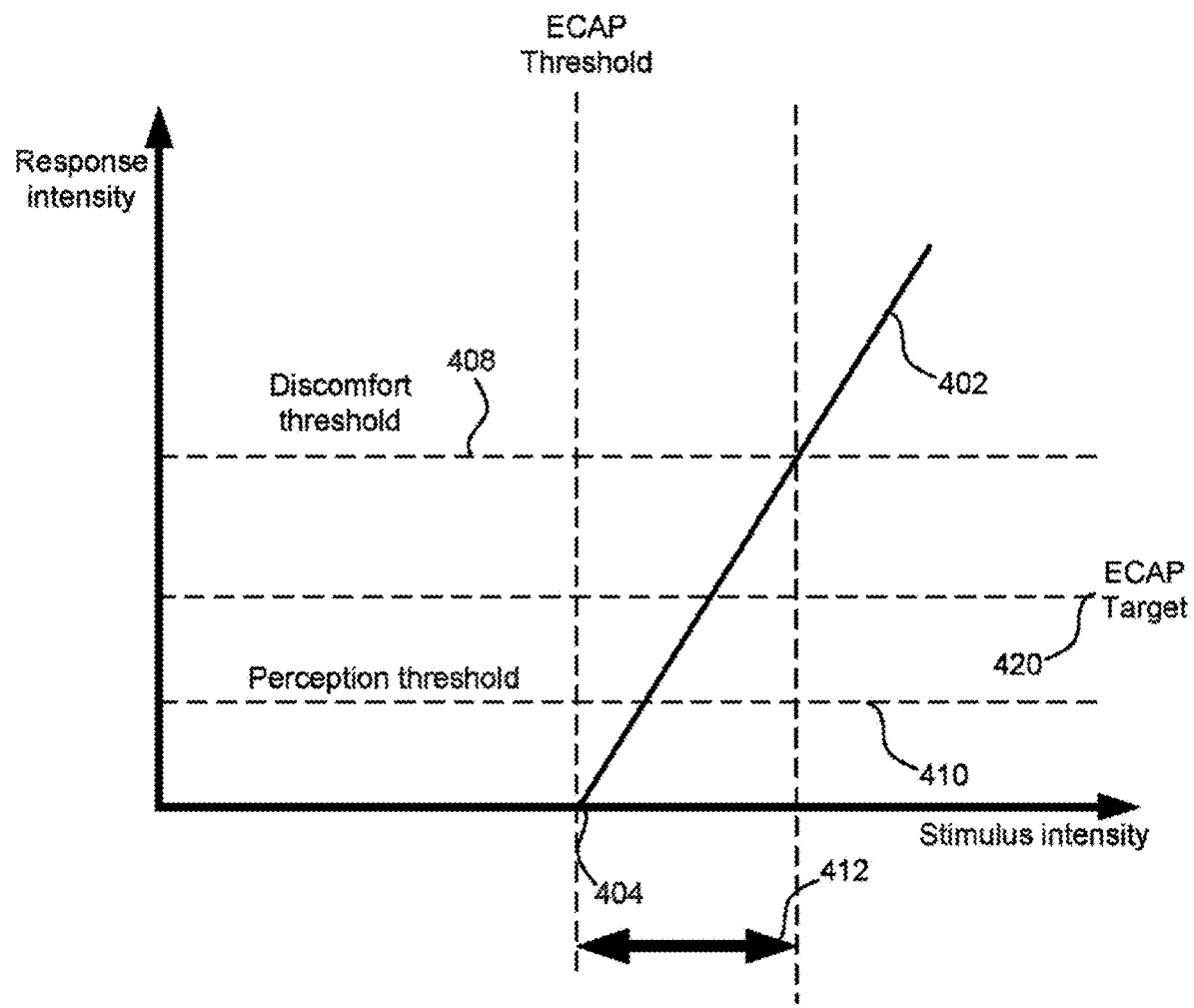
FIG. 4 illustrates an idealised activation plot for one posture of a patient undergoing neural stimulation.

An activation plot, or growth curve, is an approximation to the relationship between stimulus intensity (e.g. an amplitude of the current pulse 160) and intensity of neural response 170 resulting from the stimulus (e.g. an ECAP amplitude). FIG. 4 illustrates an idealised activation plot 402 for one posture of the patient 108. The activation plot 402 shows a linearly increasing ECAP amplitude for stimulus intensity values above a threshold 404 referred to as the ECAP threshold. The ECAP threshold exists because of the binary nature of fibre recruitment; if the field strength is too low, no fibres will be recruited. However, once the field strength exceeds a threshold, fibres begin to be recruited, and their individual evoked action potentials are independent of the strength of the field. The ECAP threshold 404 therefore reflects the field strength at which significant numbers of fibres begin to be recruited, and the increase in response intensity with stimulus intensity above the ECAP threshold reflects increasing numbers of fibres being recruited. Below the ECAP threshold 404, the ECAP amplitude may be taken to be zero. Above the ECAP threshold 404, the activation plot 402 has a positive, approximately constant slope indicating a linear relationship between stimulus intensity and the ECAP amplitude. Such a relationship may be modelled as:

$$y = \begin{cases} S(s-T), & s \geq T \\ 0, & s < T \end{cases} \quad (1)$$

where s is the stimulus intensity, y is the ECAP amplitude, T is the ECAP threshold and S is the slope of the activation plot (referred to herein as the patient sensitivity). The slope S and the ECAP threshold T are the key parameters of the activation plot 402.

FIG. 4 also illustrates a discomfort threshold 408, which is an ECAP amplitude above which the patient 108 experiences uncomfortable or painful stimulation. FIG. 4 also illustrates a perception threshold 410. The perception threshold 410 corresponds to an ECAP amplitude that is perceivable by the patient. There are a number of factors which can influence the position of the perception threshold 410, including the posture of the patient. Perception threshold 410 may correspond to a stimulus intensity that is greater than the ECAP threshold 404, as illustrated in FIG. 4, if patient 108 does not perceive low levels of neural activation. Conversely, the perception threshold 410 may correspond to a stimulus intensity that is less than the ECAP threshold 404, if the patient has a high perception sensitivity to lower levels of neural activation than can be detected in an ECAP, or if the signal to noise ratio of the ECAP is low.

For effective and comfortable operation of an implantable neuromodulation device such as the stimulator 100, it is desirable to maintain stimulus intensity within a therapeutic range. A stimulus intensity within a therapeutic range 412 is above the ECAP threshold 404 and evokes an ECAP amplitude that is below the discomfort threshold 408.

To keep the applied stimulus intensity within the therapeutic range as patient posture varies, in some implementations an implantable neuromodulation device such as the stimulator 100 may adjust the applied stimulus intensity based on a feedback variable that is determined from one or more measured ECAP characteristics. In one implementation, the device may adjust the stimulus intensity to maintain the measured ECAP amplitude at a target response intensity. For example, the device may calculate an error between a target ECAP amplitude and a measured ECAP amplitude, and adjust the applied stimulus intensity to reduce the error as much as possible, such as by adding the scaled error to the current stimulus intensity. A neuromodulation device that operates by adjusting the applied stimulus intensity based on a measured ECAP characteristic is said to be operating in closed-loop mode and will also be referred to as a closed-loop neural stimulation (CLNS) device. By adjusting the applied stimulus intensity to maintain the measured ECAP amplitude at an appropriate target response intensity, such as an ECAP target 420 illustrated in FIG. 4, a CLNS device will generally keep the stimulus intensity within the therapeutic range as patient posture varies.

A CLNS device comprises a stimulator that takes a stimulus intensity value and converts it into a neural stimulus comprising a sequence of electrical pulses according to a predefined stimulation pattern. The stimulation pattern is parametrised by multiple stimulus parameters including stimulus amplitude, pulse width, number of phases, order of phases, number of stimulus electrode poles (two for bipolar, three for tripolar etc.), and stimulus rate or frequency. At least one of the stimulus parameters, for example the stimulus amplitude, is controlled by the feedback loop.

In an example CLNS system, a user (e.g. the patient or a clinician) sets a target response intensity, and the CLNS device performs proportional-integral-differential (PID) control. In some implementations, the differential contribution is disregarded and the CLNS device uses a first order integrating feedback loop. The stimulator produces stimulus in accordance with a stimulus intensity parameter, which evokes a neural response in the patient. The intensity of an evoked neural response (e.g. an ECAP) is detected, and its amplitude measured by the CLNS device and compared to the target response intensity.

The measured neural response intensity, and its deviation from the target response intensity, is used by the feedback loop to determine possible adjustments to the stimulus intensity parameter to maintain the neural response at the target intensity. If the target intensity is properly chosen, the patient receives consistently comfortable and therapeutic stimulation through posture changes and other perturbations to the stimulus/response behaviour.

Figure 5:
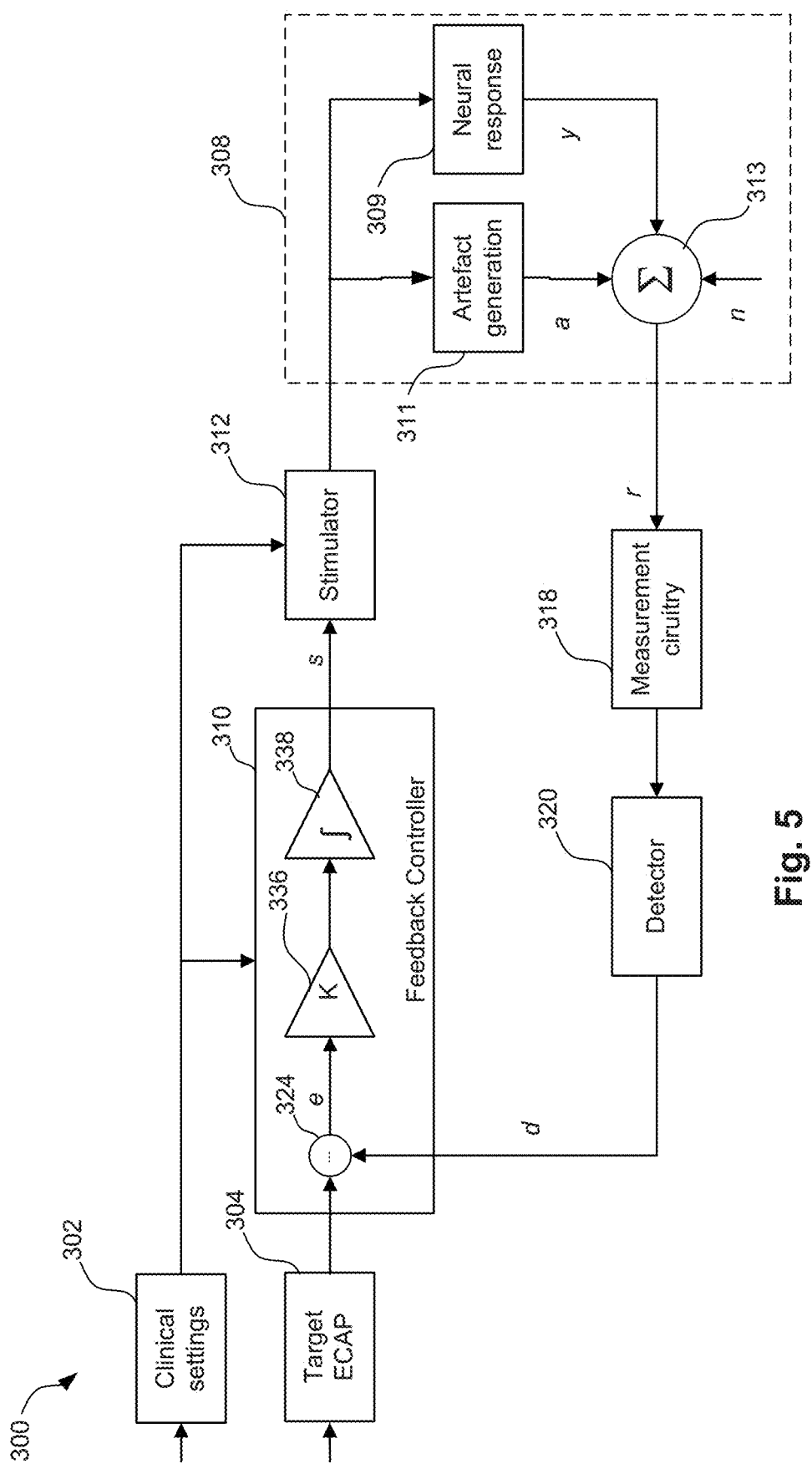
FIG. 5 is a schematic illustrating elements and inputs of a closed-loop neural stimulation system, according to one implementation of the present technology.

FIG. 5 is a schematic illustrating elements and inputs of a closed-loop neural stimulation system (CLNS) 300, according to one implementation of the present technology. The system 300 comprises a stimulator 312 which converts a stimulus intensity parameter (for example a stimulus current amplitude) s, in accordance with a set of predefined stimulus parameters, to a neural stimulus comprising a sequence of electrical pulses on the stimulus electrodes (not shown in FIG. 5). According to one implementation, the predefined stimulus parameters comprise the number and order of phases, the number of stimulus electrode poles, the pulse width, and the stimulus rate or frequency.

The generated stimulus crosses from the electrodes to the spinal cord, which is represented in FIG. 5 by the dashed box 308. The box 309 represents the evocation of a neural response y by the stimulus as described above. The box 311 represents the evocation of an artefact signal a, which is dependent on stimulus intensity and other stimulus parameters, as well as the electrical environment of the measurement electrodes. Various sources of noise n, as well as the artefact a, may add to the evoked response y at the summing element 313 to form the sensed signal r, including electrical noise from external sources such as 50 Hz mains power; electrical disturbances produced by the body such as neural responses evoked not by the device but by other causes such as peripheral sensory input, EEG, EMG, and electrical noise from measurement circuitry 318.

The neural recruitment arising from the stimulus is affected by mechanical changes, including posture changes, walking, breathing, heartbeat and so on. Mechanical changes may cause impedance changes, or changes in the location and orientation of the nerve fibres relative to the electrode array(s). As described above, the intensity of the evoked response provides a measure of the recruitment of the fibres being stimulated. In general, the more intense the stimulus, the more recruitment and the more intense the evoked response. An evoked response typically has a maximum amplitude in the range of microvolts, whereas the voltage resulting from the stimulus applied to evoke the response is typically several volts.

Measurement circuitry 318, which may be identified with measurement circuitry 128, amplifies the sensed signal r (including evoked neural response, artefact, and noise) and samples the amplified sensed signal r to capture a "signal window" comprising a predetermined number of samples of the amplified sensed signal r. The ECAP detector 320 processes the signal window and outputs a measured neural response intensity d. A typical number of samples in a captured signal window is 60. In one implementation, the neural response intensity comprises an ECAP amplitude. The measured response intensity d is input into the feedback controller 310. The feedback controller 310 comprises a comparator 324 that compares the measured response intensity d to a target ECAP amplitude as set by the target ECAP controller 304 and provides an indication of the difference between the measured response intensity d and the target ECAP amplitude. This difference is the error value, e.

The feedback controller 310 calculates an adjusted stimulus intensity parameter, s, with the aim of maintaining a measured response intensity d equal to the target ECAP amplitude. Accordingly, the feedback controller 310 adjusts the stimulus intensity parameters to minimise the error value, e. In one implementation, the controller 310 utilises a first order integrating function, using a gain element 336 and an integrator 338, in order to provide suitable adjustment to the stimulus intensity parameter s. According to such an implementation, the current stimulus intensity parameters may be computed by the feedback controller 310 as $$s = \int Ke\, dt \qquad (2)$$

where K is the gain of the gain element 336 (the controller gain). This relation may also be represented as where δs is an adjustment to the current stimulus intensity parameter s.

A target ECAP amplitude is input to the comparator 324 via the target ECAP controller 304. In one embodiment, the target ECAP controller 304 provides an indication of a specific target ECAP amplitude. In another embodiment, the target ECAP controller 304 provides an indication to increase or to decrease the present target ECAP amplitude. The target ECAP controller 304 may comprise an input into the neuromodulation device, via which the patient or clinician can input a target ECAP amplitude, or indication thereof. The target ECAP controller 304 may comprise memory in which the target ECAP amplitude is stored, and from which the target ECAP amplitude is provided to the feedback controller 310.

A clinical settings controller 302 provides clinical settings to the system 300, including the gain K for the gain element 336 and the stimulus parameters for the stimulator 312. The clinical settings controller 302 may be configured to adjust the gain K of the gain element 336 to adapt the feedback loop to patient sensitivity. The clinical settings controller 302 may comprise an input into the neuromodulation device, via which the patient or clinician can adjust the clinical settings. The clinical settings controller 302 may comprise memory in which the clinical settings are stored, and are provided to components of the system 300.

In some implementations, two clocks (not shown) are used, being a stimulus clock operating at the stimulus frequency (e.g. 60 Hz) and a sample clock for sampling the sensed signal r (for example, operating at a sampling frequency of 10 kHz). As the ECAP detector 320 is linear, only the stimulus clock affects the dynamics of the CLNS system 300. On the next stimulus clock cycle, the stimulator 312 outputs a stimulus in accordance with the adjusted stimulus intensity s. Accordingly, there is a delay of one stimulus clock cycle before the stimulus intensity is updated in light of the error value e.

Figure 7:
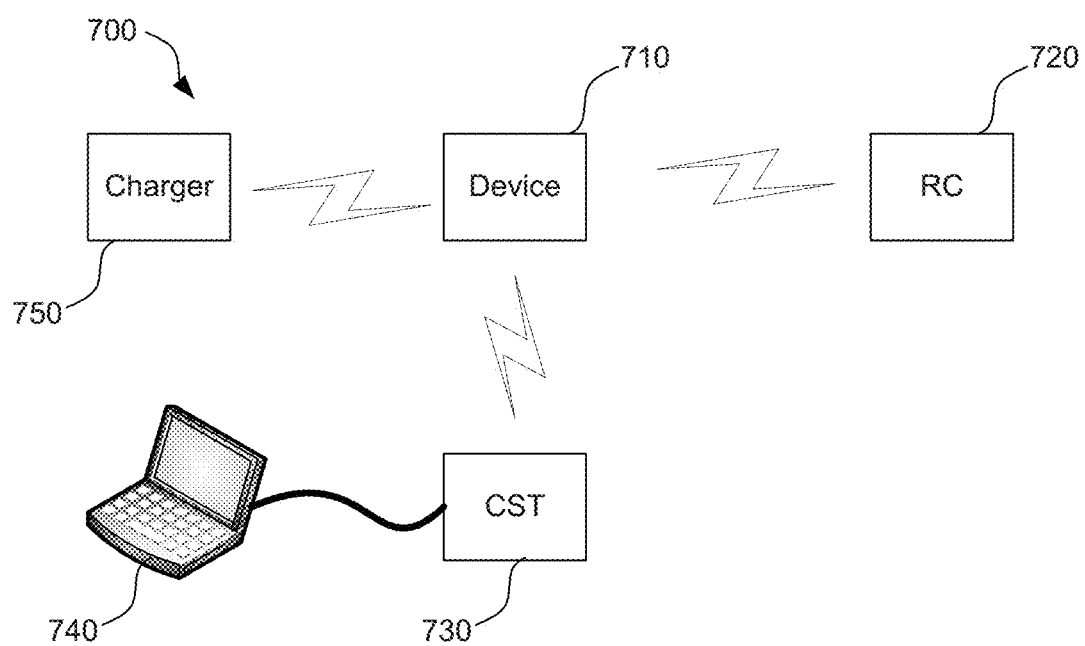
FIG. 7 is a block diagram of a neural stimulation therapy system including the implanted stimulator of FIG. 1 according to one implementation of the present technology.

FIG. 7 is a block diagram of a neural stimulation system 700. The neural stimulation system 700 is centred on a neuromodulation device 710. In one example, the neuromodulation device 710 may be implemented as the stimulator 100 of FIG. 1, implanted within a patient (not shown). The neuromodulation device 710 is connected wirelessly to a remote controller (RC) 720. The remote controller 720 is a portable computing device that provides the patient with control of their stimulation in the home environment by allowing control of the functionality of the neuromodulation device 710, including one or more of the following functions: enabling or disabling stimulation; adjustment of stimulus intensity or target neural response intensity; and selection of a stimulation control program from the control programs stored on the neuromodulation device 710.

The charger 750 is configured to recharge a rechargeable power source of the neuromodulation device 710. The recharging is illustrated as wireless in FIG. 7 but may be wired in alternative implementations.

The neuromodulation device 710 is wirelessly connected to a Clinical System Transceiver (CST) 730. The wireless connection may be implemented as the transcutaneous communications channel 190 of FIG. 1. The CST 730 acts as an intermediary between the neuromodulation device 710 and the Clinical Interface (CI) 740, to which the CST 730 is connected. A wired connection is shown in FIG. 7, but in other implementations, the connection between the CST 730 and the CI 740 is wireless.

The CI 740 may be implemented as the external computing device 192 of FIG. 1. The CI 740 is configured to program the neuromodulation device 710 and recover data stored on the neuromodulation device 710. This configuration is achieved by program instructions collectively referred to as the Clinical Programming Application (CPA) and stored in an instruction memory of the CI 740.

ECAP De-Truncation

As mentioned above, the neural responses may be processed by the ECAP detector 320 to determine the peak-to-peak ECAP amplitude in accordance with the teachings of International Patent Publication No. WO2015/074121. The implementation of the ECAP detector 320 disclosed in International Patent Publication No. WO2015/074121 is an example of a correlation-based detector. Such a correlation-based detector computes a cross-correlation between the samples in the captured signal window and the samples of a parametrised filter template such as the 4-lobe filter and computes the amplitude of the ECAP in the signal window from the peak value of the cross-correlation. For efficiency of implementation, the cross-correlation may be computed at a single correlation delay to provide the ECAP amplitude. International Patent Publication No. WO2015/074121 discloses how the optimum correlation delay may be estimated such that the single cross-correlation at the optimum correlation delay yields the most accurate estimate of the actual amplitude of the ECAP in the presence of artefact. The optimum correlation delay is dependent on the location of the ECAP within the signal window, and therefore may be used as an indicator of the location of the ECAP within the signal window. The correlation-based detector may be referred to as a parametric detector since it has at least one adjustable parameter, namely the optimum correlation delay. A correlation-based detector using the 4-lobe filter has a further parameter, the frequency or period of the lobes.

The captured signal window begins a fixed interval after the end of the stimulus pulse. In some implementations in which the measurement circuitry is "blanked" as described above, the captured signal window begins at the end of the blanking interval of the measurement circuitry. In other implementations, the measurement circuitry is not blanked, and the fixed interval has a length of zero samples. Such implementations are particularly susceptible to artefact. The captured signal window comprises multiple samples of the sensed signal captured at the sampling frequency of the measurement circuitry. The correlation delay represents the sample location, measured from the start of the signal window, of a reference point of the filter to be correlated with the signal window. The controller 116 implementing the ECAP detector 320 may repeatedly estimate the optimum correlation delay to ensure accurate amplitude estimation as the therapy circumstances change in a way that affects the location of the ECAP within the signal window. One example of such a change of circumstances is change in the relative position of the measurement electrodes and the stimulus site, due to lead migration.

In certain circumstances the optimum correlation delay gets small enough that a significant portion of the filter lies before the start of the captured signal window. The effect of this is that the correlation of the filter with the signal window misses a significant portion of the ECAP. For example, if the filter is 32 samples long, an optimum correlation delay of less than 16 samples means that at least one sample of the filter will not contribute to the correlation, and a delay of less than 8 samples means that more than a quarter of the filter samples will not contribute to the correlation. This in turn will mean that the correlation peak value may not yield an accurate estimate of the actual ECAP amplitude. This inaccuracy may reflect the fact that a corresponding significant portion of the ECAP has been truncated from the captured signal window by the blanking of the measurement circuitry. Alternatively, if there is no blanking interval, the inaccuracy may reflect the corruption of the early samples in the window by high values of artefact. The ECAP is effectively truncated by this corruption.

Figure 8:
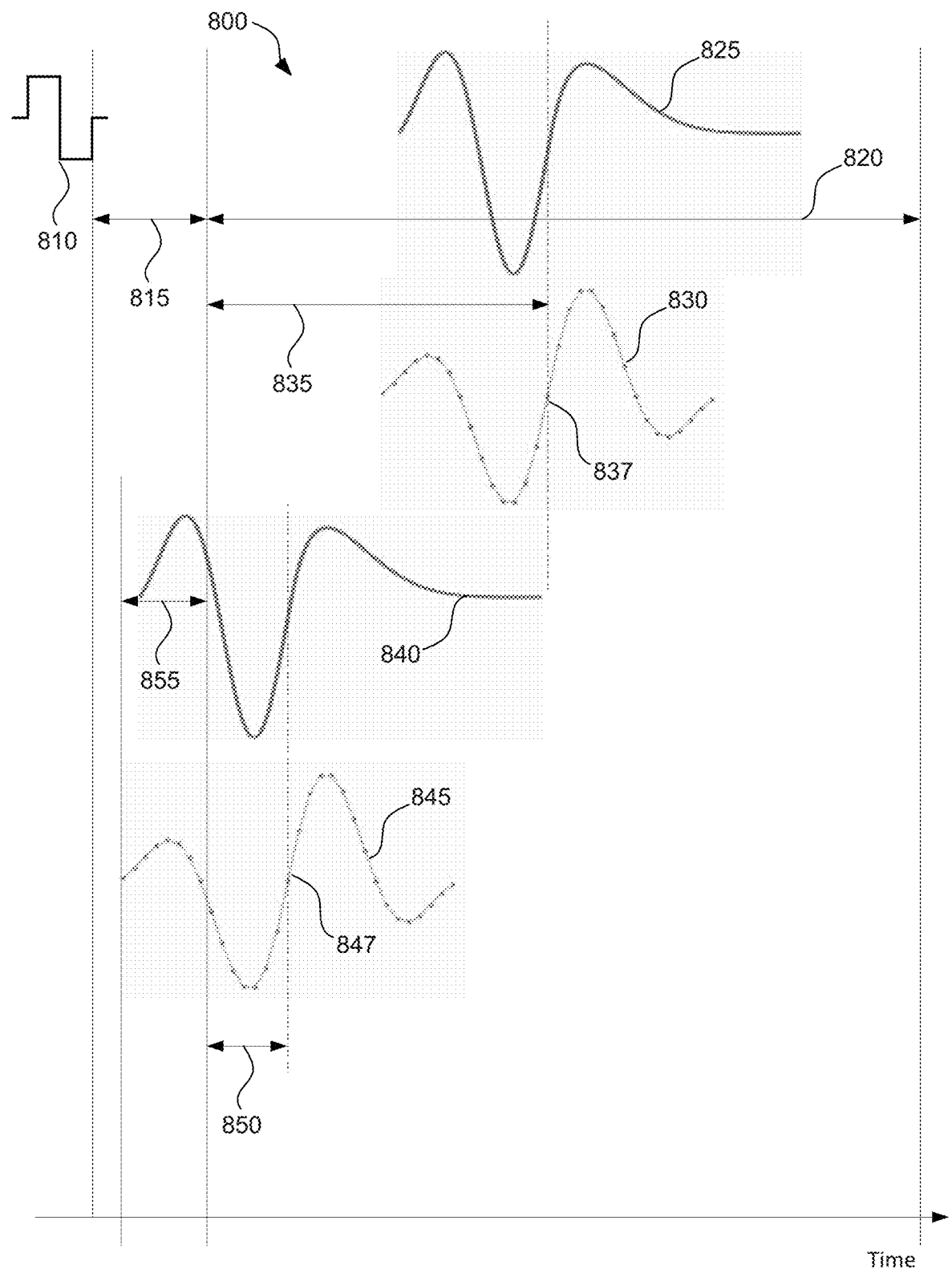
FIG. 8 is a time graph containing ECAPs and matching 4-lobe filters under different circumstances.

The phenomenon of truncation is illustrated in FIG. 8, which is a time graph 800 containing ECAPs and matching 4-lobe filters under different circumstances. The biphasic stimulus pulse 810 evokes the ECAP 825 or, under different circumstances, the ECAP 840. The ECAPs 825 and 840 are located along the time axis at their respective times of arrival at the measurement electrode pair. The blanking interval 815 starts at the end of the stimulus pulse 810. The signal window 820 starts at the end of the blanking interval 815. The filter 830 is illustrated at its optimum delay relative to the start of the signal window 820 in order to accurately estimate the amplitude of the ECAP 825. The corresponding optimum delay 835 is the location of the reference point of the filter 830, illustrated in FIG. 8 as the point of symmetry 837 of the filter 830, relative to the start of the signal window 820.

Likewise, the filter 845 is illustrated at its optimum delay relative to the start of the signal window 820 in order to accurately estimate the amplitude of the ECAP 840, which is evoked earlier in time than the ECAP 825. The corresponding optimum delay 850 is the location of the reference point 847 of the filter 845 relative to the start of the signal window 820. It may be seen that the portion 855 of the ECAP 840 lies outside (prior to) the signal window 820 and therefore does not contribute to the correlation between the ECAP 840 and the filter 845, even though the filter 845 is located at its optimum delay 850. The ECAP 840 is therefore truncated and the portion 855 is the truncated portion of the ECAP 840.

According to a strict definition, truncation is taking place if at least one sample of the filter, located at its optimum delay, lies outside the signal window. The presence and amount of truncation may be determined from the optimum delay, the length of the filter, and the location of the reference point on the filter. For example if the filter is 32 samples long and the reference point is the midpoint of the filter, then truncation by the strict definition is taking place if the optimum delay is less than 16 samples. According to a looser definition, truncation is taking place if a significant portion of the filter, located at its optimum delay, lies outside the signal window so as to substantially affect the result of the correlation.

Since the blanking interval is applied from the end of the stimulus pulse, but the ECAP is potentially evoked from the start of the stimulus pulse, the captured signal window starts later in time relative to the start of the ECAP for wider stimulus pulses. Therefore, there is a greater likelihood of ECAP truncation for stimulation with longer pulse widths.

ECAP truncation may also occur at the other end of the signal window 820 if the circumstances are such that the arrival time of the ECAP at the measurement electrodes is significantly increased from the situation illustrated at the top of FIG. 8 with waveforms 825 and 830. This situation is simply the mirror reverse of the situation illustrated at the bottom of FIG. 8 with waveforms 840 and 845.

As mentioned above, International Patent Publication No. WO2015/074121 discloses how the optimum correlation delay may be estimated such that the single cross-correlation at the optimum delay yields the most accurate estimate of the actual amplitude of the ECAP in the presence of artefact. However, as the ECAP moves toward the start or end of the signal window and starts to be truncated, the estimation of optimum delay becomes less accurate. The correlation-based detector alone therefore cannot give a wholly reliable answer as to whether, and how much, truncation is occurring.

Another method of determining the location of the ECAP within the signal window is to apply a model-based ECAP detector to the captured signal window. A model-based ECAP detector is described by the present applicant in International Patent Publication No. WO2019/204884, the content of which is incorporated herein by reference. A model-based ECAP detector models the captured signal window as a composite of ECAP and artefact components with some noise. Each component is modelled as a weighted sum of parametric basis functions. An optimisation method utilising a cost function may be employed to fit the optimum parameters and weights of the components to the samples in the signal window. The amplitude of the ECAP may be estimated from the parameters of the fitted ECAP component. The location of the fitted ECAP component within the signal window may also be derived from the parameters of the fitted ECAP component. The optimum delay of a correlation-based ECAP detector may be estimated from the location of the fitted ECAP component within the signal window.

The model fitting of the model-based ECAP detector is more robust to truncation of the ECAP than the correlation-based ECAP detector described previously. This means that a model-based ECAP detector generally provides more accurate estimates of both ECAP amplitude and optimum delay of a correlation-based detector than a correlation-based detector itself. However, a model-based ECAP detector is more computationally intensive than a correlation-based ECAP detector.

According to one implementation of the present technology, the ECAP detector 320 is a hybrid, using the correlation-based approach most of the time but with occasional instances of the model-based detector to check for truncation. If truncation is detected, remedial action may be taken. This hybrid approach is less computationally intensive than a pure model-based ECAP detector would be but is more robust than a correlation-based ECAP detector to changes in arrival time of the ECAP at the measurement electrodes.

Figure 9:
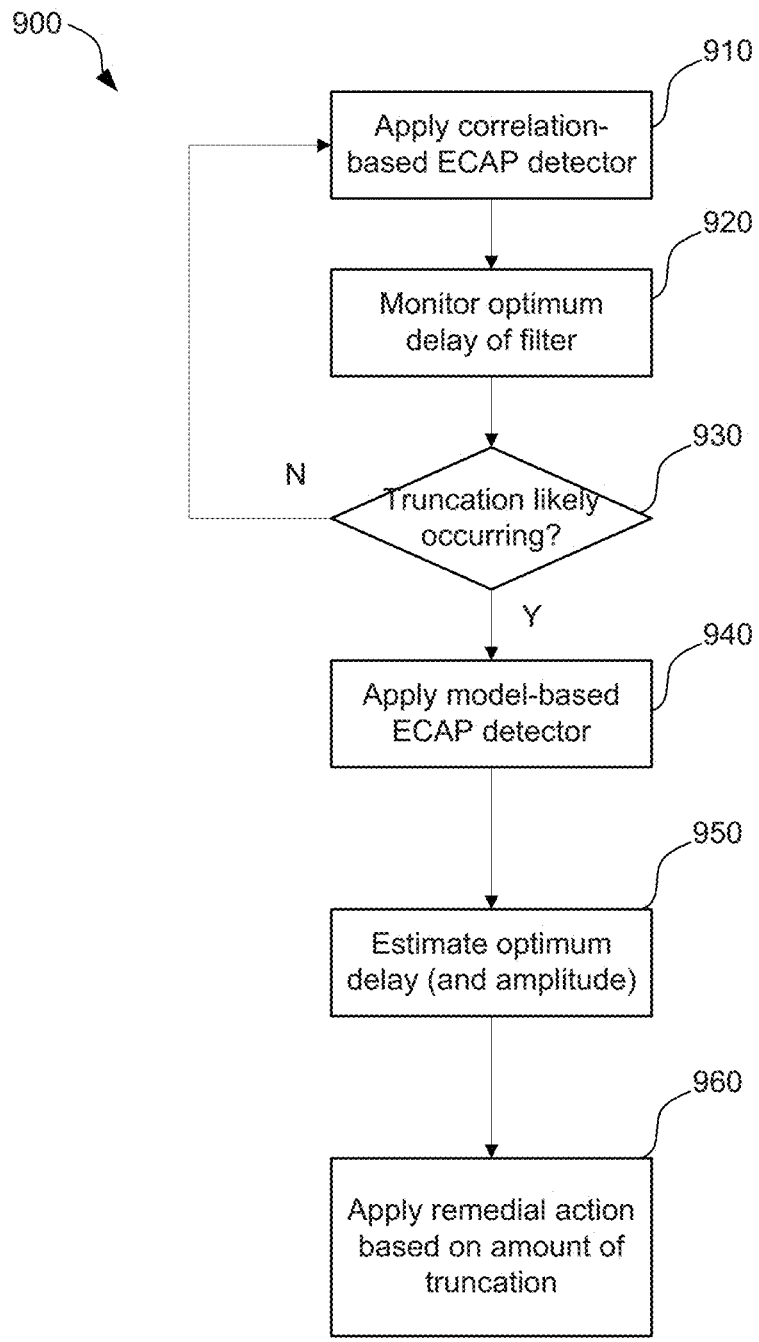
FIG. 9 is a flow chart illustrating a method of detecting ECAPs using a hybrid approach that is robust to truncation, in accordance with one aspect of the present technology.

FIG. 9 is a flow chart illustrating a method 900 of detecting ECAPs using a hybrid approach that is robust to truncation, in accordance with one aspect of the present technology. The method 900 may be carried out by the controller 116 to implement the ECAP detector 320 of the CLNS system 300 of FIG. 3, after each stimulus pulse is delivered.

The method 900 starts at step 910, which applies a correlation-based ECAP detector to the signal window to estimate an amplitude of the ECAP within the signal window. The ECAP detector is further configured to estimate at step 920 the optimum delay of the correlation filter, not necessarily after every stimulus but regularly enough to cope with changes in circumstances that significantly affect the arrival time. As mentioned above, the optimum delay of the correlation filter is an indicator of the location of the ECAP within the signal window, so step 920 effectively monitors the estimated location of the ECAP within the signal window. If the location monitoring of step 920 indicates that truncation is not likely to be occurring ("N" at step 930), the method 900 returns to step 910 to await the next signal window. If the location monitoring indicates that truncation is likely to be occurring ("Y" at step 930), the method 900 proceeds to step 940, which applies a model-based ECAP detector to the current signal window to fit an ECAP component to the signal window in a manner that is robust to truncation of the ECAP. Step 950 then uses the fitted parameters of the ECAP component to estimate the optimum delay of the correlation-based detector and hence the amount of truncation that is occurring with the correlation-based detector. Step 950 may optionally also estimate the amplitude of the ECAP from the fitted parameters of the ECAP component. Such an amplitude estimate would replace the estimate provided by the correlation-based detector at step 910. Step 960 then takes remedial action to mitigate the determined amount of truncation as described below.

In an alternative implementation of the hybrid approach, the application of the model-based ECAP detector at step 940 may additionally or alternatively be triggered by the approach of the ECAP amplitude to the discomfort threshold 408, indicating a serious risk of discomfort if the ECAP amplitude is under-estimated. In a further alternative implementation, the application of the model-based ECAP detector at step 940 occurs at regularly timed intervals, e.g. once per second.

One implementation of step 960 is to adjust the optimum delay of the correlation-based detector to be applied at the next iteration of the method 900 using the optimum delay estimated at step 950. This implementation would only make sense if the optimum delay estimated at step 950 indicated that in fact no significant truncation of the ECAP was occurring and the "Y" at step 930 was a "false alarm". An optional further step is to adjust the frequency or period of the correlation-based detector based on the fitted ECAP component. This will also improve the accuracy of ECAP amplitude estimation by the correlation-based detector at the next iteration of the method 900.

Another implementation of step 960, to be used if the amount of truncation is significant, is to compute an amplitude adjustment factor that can be applied to the estimate of ECAP amplitude obtained from the correlation-based detector at step 910 to compensate for any truncation at future iterations of the method 900. In one such implementation, the amplitude adjustment factor may be computed as the amplitude estimate returned by the model-based ECAP detector at step 950 divided by the amplitude estimate returned by the correlation-based ECAP detector at step 910.

Another implementation of step 960, to be used if the truncation is at the start of the signal window, is to shorten the pulse width of the stimulus pulses. This will bring forward in time the start of the signal window relative to the ECAP and reduce the amount of truncation at the start of the signal window.

Another implementation of step 960 is to change the measurement electrode pair to a pair of electrodes that are further away from, or closer to, the stimulus site, depending on the direction of truncation. For example, if the truncation is at the start of the signal window, the measurement electrode pair may be changed so as to be further away from the stimulus site. Conversely, if the truncation is at the end of the signal window, the measurement electrode pair may be changed so as to be closer to the stimulus site. Such a change alters the arrival time of the ECAP at the new measurement electrode pair to position the ECAP more centrally within the signal window and hence reduce, or even eliminate, ECAP truncation. The minimum recommended change of measurement electrodes (in number of contacts) may be estimated as the amount of truncation (in samples) multiplied by the conduction velocity (in mm/s) divided by the sampling frequency (in Hz) divided by the contact spacing (in mm).

The use of the hybrid method 900 of ECAP detection to detect and mitigate ECAP truncation makes practical the use of longer stimulus pulse widths, e.g. 400 μs and greater, in CLNS systems. The use of longer stimulus pulse widths is limited by ECAP truncation if a purely correlation-based ECAP detector 320 is used. (Longer pulse width stimulation increases stimulus field coverage and also activates more of the smaller diameter fibres which respond later than large-diameter fibres.)

According to another aspect of the present technology, a hybrid approach is not used; instead, a model-based ECAP detector rather than a correlation-based detector is used at every stimulus. While the model-based ECAP detector is more robust to truncation, some mitigation of truncation may still improve performance. In one such implementation, a method similar to the method 900 may be used, except that at step 910, the model-based ECAP detector is used to estimate the location of the ECAP component within the signal window as well as the amplitude of the ECAP. Step 920 monitors the location of the ECAP component within the signal window and step 930 determines whether truncation is occurring based on the location of the ECAP component within the signal window. Steps 940 and 950 may be omitted as the model-based detector already estimated the optimum delay and amplitude at step 910. Only some of the above-described implementations of the remedial action step 960 are appropriate for this implementation, such as shortening the stimulus pulse width or changing the measurement electrode pair.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not limiting or restrictive.

| LABEL LIST | |
|---|---|
| implanted stimulator | 100 |
| patient | 108 |
| electronics module | 110 |
| battery | 112 |
| telemetry module | 114 |
| controller | 116 |
| memory | 118 |
| clinical data | 120 |
| clinical settings | 121 |
| control programs | 122 |
| pulse generator | 124 |
| electrode selection module | 126 |
| measurement circuitry | 128 |
| system ground | 130 |
| electrode array | 150 |
| biphasic stimulus pulse | 160 |
| ECAP | 170 |
| nerve | 180 |
| transcutaneous communications channel | 190 |
| external device | 192 |
| CLNS system | 300 |
| clinical settings controller | 302 |
| target ECAP controller | 304 |
| box | 308 |
| box | 309 |
| feedback controller | 310 |
| box | 311 |
| stimulator | 312 |
| element | 313 |
| signal amplifier | 318 |
| ECAP detector | 320 |
| comparator | 324 |
| gain element | 336 |
| integrator | 338 |
| activation plot | 402 |
| ECAP threshold | 404 |
| discomfort threshold | 408 |
| perception threshold | 410 |
| therapeutic range | 412 |
| ECAP target | 420 |
| single - ended ECAP | 600 |
| neuromodulation system | 700 |
| neuromodulation device | 710 |
| remote controller | 720 |
| clinical system transceiver | 730 |
| clinical interface | 740 |
| charger | 750 |
| time graph | 800 |
| stimulus pulse | 810 |
| interval | 815 |
| signal window | 820 |
| ECAP | 825 |
| filter | 830 |
| optimum delay | 835 |
| point of symmetry | 837 |
| ECAP | 840 |
| filter | 845 |
| reference point | 847 |
| optimum delay | 850 |
| portion | 855 |
| method | 900 |
| step | 910 |
| step | 920 |
| step | 930 |
| step | 940 |
| step | 950 |
| step | 960 |

The invention claimed is:

1. An implantable device for controllably delivering a neural stimulus, the device comprising:
    a plurality of electrodes including one or more stimulus electrodes and one or more sense electrodes;
    a stimulus source configured to provide a neural stimulus to be delivered via the one or more stimulus electrodes to a neural pathway of a patient in order to evoke a neural response on the neural pathway;
    measurement circuitry configured to process a signal window sensed at the one or more sense electrodes subsequent to the delivered neural stimulus, the sensed signal window including an evoked neural response; and
    a control unit configured to:
        control the stimulus source to provide the neural stimulus according to a stimulus parameter;
        estimate, using a detector, a location of the evoked neural response within the sensed signal window;
        determine, based on the location of the evoked neural response within the sensed signal window, whether truncation of the evoked neural response by the sensed signal window is occurring;
        mitigate, based on the determination, the truncation of the evoked neural response by either adjusting the detector or changing the one or more sense electrodes;
        control the stimulus source to provide a second neural stimulus according to the stimulus parameter;
        measure, using the sense electrodes and the detector, an intensity of an evoked neural response within a sensed signal window subsequent to the second neural stimulus;
        compute a feedback variable from the measured intensity of the evoked neural response; and
        implement a feedback controller which completes a feedback loop, the feedback controller using the computed feedback variable to control the stimulus parameter so as to maintain the feedback variable at a target response intensity.

2. The implantable device of claim 1, wherein the detector is a correlation-based detector.

3. The implantable device of claim 2, wherein the control unit is configured to estimate the location of the evoked neural response within the sensed signal window from an optimum delay of the correlation-based detector.

4. The implantable device of claim 2, wherein the control unit is further configured to fit, using a model-based detector, based on the determination of whether truncation is occurring, an ECAP component to the signal window.

5. The implantable device of claim 4, wherein the control unit is configured to mitigate the truncation by adjusting a parameter of the correlation-based detector based on an amount of truncation of the fitted ECAP component by the signal window.

6. The implantable device of claim 5, wherein the control unit is configured to mitigate the truncation by adjusting an optimum delay of the correlation-based detector based on a location of the fitted ECAP component within the signal window.

7. The implantable device of claim 4, wherein the control unit is configured to mitigate the truncation by computing an amplitude adjustment factor based on an amplitude of the fitted ECAP component.

8. The implantable device of claim 7, wherein the control unit is configured to compute the amplitude adjustment factor by dividing an amplitude of the fitted ECAP component by an intensity of the evoked neural response measured by the correlation-based detector.

9. The implantable device of claim 1, wherein the detector is a model-based detector.

10. The implantable device of claim 9, wherein the control unit is further configured to fit, using the model-based detector, an ECAP component to the signal window, thereby estimating the location of the evoked neural response within the sensed signal window.

11. The implantable device of claim 1, wherein the control unit is configured to mitigate the truncation by adjusting a pulse width of the neural stimulus.

12. The implantable device of claim 1, wherein the control unit is configured to mitigate the truncation by changing the one or more sense electrodes to different electrodes among the plurality of electrodes.

13. An automated method of controllably delivering a neural stimulus, the method comprising:
    delivering, via one or more stimulus electrodes of a plurality of electrodes, the neural stimulus to a neural pathway of a patient in order to evoke a neural response on the neural pathway, the stimulus being parametrised by a stimulus parameter;
    sensing a signal window subsequent to the delivered neural stimulus at one or more sense electrodes of the plurality of electrodes, the sensed signal window including an evoked neural response;
    estimating, using a detector, a location of the evoked neural response within the sensed signal window including the evoked neural response;
    determining, based on the location of the evoked neural response within the sensed signal window, whether truncation of the evoked neural response by the sensed signal window is occurring;
    mitigating, based on the determination, the truncation of the evoked neural response by either adjusting the detector or changing the one or more sense electrodes;
    delivering a second neural stimulus according to the stimulus parameter;
    measuring, using the detector, an intensity of an evoked neural response within a signal window sensed at the one or more sense electrodes subsequent to the second neural stimulus;
    computing a feedback variable from the measured intensity of the evoked neural response; and
    implementing a feedback controller which completes a feedback loop, the feedback controller using the computed feedback variable to control the stimulus parameter so as to maintain the feedback variable at a target response intensity.

14. The method of claim 13, wherein the detector is a correlation-based detector.

15. The method of claim 14, wherein estimating the location of the evoked neural response within the sensed signal window uses an optimum delay of the correlation-based detector.

16. The method of claim 14, further comprising fitting, using a model-based detector, based on the determination of whether truncation is occurring, an ECAP component to the signal window.

17. The method of claim 16, wherein mitigating the truncation comprises adjusting a parameter of the correlation-based detector based on an amount of truncation of the fitted ECAP component by the signal window.

18. The method of claim 17, wherein mitigating the truncation comprises adjusting an optimum delay of the correlation-based detector based on a location of the fitted ECAP component within the signal window.

19. The method of claim 16, wherein mitigating the truncation comprises computing an amplitude adjustment factor based on an amplitude of the fitted ECAP component.

20. The method of claim 19, wherein computing the amplitude adjustment factor comprises dividing an amplitude of the fitted ECAP component by an intensity of the evoked neural response measured by the correlation-based detector.

21. The method of claim 13, wherein the detector is a model-based detector.

22. The method of claim 21, further comprising fitting, using the model-based detector, an ECAP component to the signal window, thereby estimating the location of the evoked neural response within the sensed signal window.

23. The method of claim 13, wherein mitigating the truncation comprises adjusting a pulse width of the neural stimulus.

24. The method of claim 13, wherein mitigating the truncation comprises changing the one or more sense electrodes to different electrodes among the plurality of electrodes based on an amount of truncation.

25. A neural stimulation system, comprising:
 a neuromodulation device for controllably delivering a neural stimulus, the neuromodulation device comprising:
  a plurality of electrodes including one or more stimulus electrodes and one or more sense electrodes;
  a stimulus source configured to provide a neural stimulus to be delivered via the one or more stimulus electrodes to a neural pathway of a patient in order to evoke a neural response on the neural pathway;
  measurement circuitry configured to process a signal window sensed at the one or more sense electrodes subsequent to the delivered neural stimulus, the sensed signal window including an evoked neural response; and
  a control unit configured to control the stimulus source to provide the neural stimulus according to a stimulus parameter; and
 a processor configured to:
  estimate, using a detector, a location of the evoked neural response within the sensed signal window;
  determine, based on the location of the evoked neural response within the sensed signal window, whether truncation of the evoked neural response by the sensed signal window is occurring;
  mitigate, based on the determination, the truncation of the evoked neural response by either adjusting the detector or changing the one or more sense electrodes;
  control the stimulus source to provide a second neural stimulus according to the stimulus parameter;
  measure, using the sense electrodes and the detector, an intensity of an evoked neural response within a sensed signal window subsequent to the second neural stimulus;
  compute a feedback variable from the measured intensity of the evoked neural response; and
  implement a feedback controller which completes a feedback loop, the feedback controller using the computed feedback variable to control the stimulus parameter so as to maintain the feedback variable at a target response intensity.

26. The neural stimulation system of claim 25, further comprising an external computing device in communication with the neuromodulation device.

27. The neural stimulation system of claim 26, wherein the processor is part of the external computing device.

28. The neural stimulation system of claim 25, wherein the processor is part of the neuromodulation device.

* * * * *